United States Patent [19]

Flores

[11] Patent Number: 4,642,931
[45] Date of Patent: Feb. 17, 1987

[54] COMPACT, FOLDABLE FISHING POLE SUPPORT

[76] Inventor: Rick Flores, 1121 N. Mariposa St., Burbank, Calif. 91506

[21] Appl. No.: 857,994

[22] Filed: May 1, 1986

[51] Int. Cl.$^4$ .............................................. A01K 97/10
[52] U.S. Cl. .................................... 43/21.2; 248/156; 248/523; 403/100
[58] Field of Search ........................ 43/15, 16, 17, 21.2; 211/1.3; 248/156, 158, 159, 188.7, 511, 521, 211/522, 523, 525, 528, 529, 530, 532, 533; 403/100, 403/102

[56] References Cited

U.S. PATENT DOCUMENTS

| | | | |
|---|---|---|---|
| 895,372 | 8/1908 | Hostetter et al. | 403/100 |
| 1,821,580 | 9/1931 | Rogers | 248/DIG. 10 |
| 2,572,937 | 10/1951 | Lawson | 248/533 |
| 4,177,595 | 12/1979 | Chon | 43/21.2 |
| 4,438,896 | 3/1984 | Hall | 248/523 |

Primary Examiner—M. Jordan
Attorney, Agent, or Firm—Poms, Smith, Lande & Rose

[57] ABSTRACT

A compact foldable fishing rod support includes three rods of substantially equal length and pivoting arrangements for holding said three rods together end to end, but permitting them to be folded side by side. At each junction, a slip sleeve is mounted to slide down over the junction between adjacent rods to hold the rods vertically aligned. One end of the entire assembly of rods is pointed to be driven into the ground, and the other end of the assembly is drilled out to provide a recess into which a V-shaped spring fits. A pin extends across the recess at the upper end of the assembly so that the V-shaped spring may be extended outwardly and held in position by the transverse pin to provide a V-shaped rest for the fishing pole. The rod sections are coupled together by links providing a certain amount of lost motion so that, when the slip sleeves are in place, the ends of the rods may abut. In addition, the V-shaped spring may slide all the way into the upper end of the top of the assembly and it has sharply outturned ends which fit into relieved areas on the upper surface of the assembly so that the assembly of several rods may be driven into the ground using a rock or the like, without damaging the pivot links or the V-shaped spring. After the unit is set in place, the V-shaped spring may be pulled out from its enclosing recess whereby it will open out to form the V-shaped rest for the fishing pole. A flat base or a tripod which mounts the lower end of the assembly may be employed when it is to be set up on a hard surface or one where it is not desirable to pound the assembly into the underlying ground or surface.

18 Claims, 10 Drawing Figures

U.S. Patent  Feb. 17, 1987  4,642,931
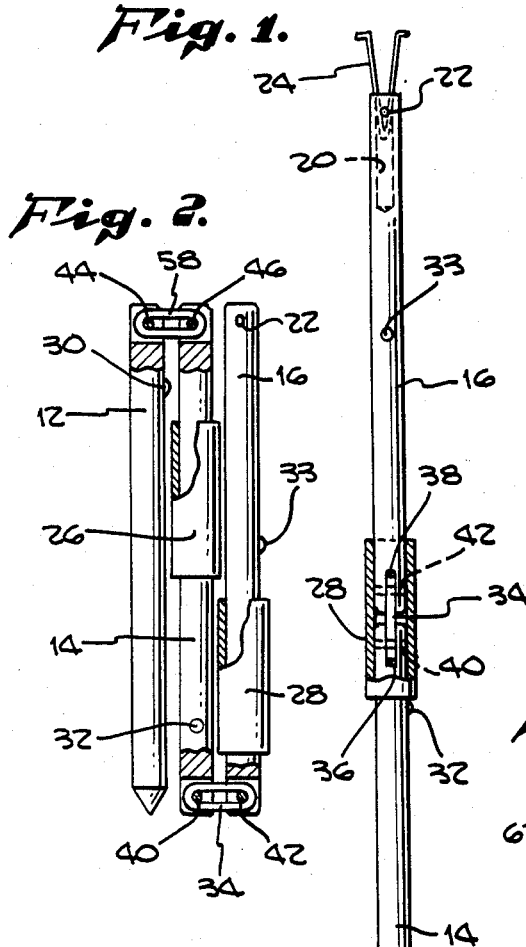

4,642,931

COMPACT, FOLDABLE FISHING POLE SUPPORT

FIELD OF THE INVENTION

The present invention relates to fishing pole supports.

BACKGROUND OF THE INVENTION

When a fisherman is fishing all day, there are many times when he does not want to hold his rod and reel but would like to continue fishing. The usual practice under such circumstances is to cut a branch from a nearby bush or tree with a V-shaped branching area, and point the other end of the branch, which might be 18 inches or 2 feet long, and implant the pointed end into the ground, with the V-shaped portion of the branch extending upwardly to hold the shaft of the fishing rod. However, as more stringent environmental regulations have come into existence, with the cutting of shrubs and trees being prohibited, fishermen must look to other arrangements for supporting their fishing rods. Up to the present time, no simple, lightweight, and compact arrangements have been available to fulfill this need.

Accordingly, a principal object of the present invention is to provide a simple, compact, foldable fishing rod support which is convenient to use, reliable, and inexpensive.

SUMMARY OF THE INVENTION

In accordance with the present invention, the foregoing objects may be achieved through the use of a fishing rod support assembly which includes several short sections of rod which are pivotally secured together. The pivot points include arrangements whereby the rods may be folded to a side-by-side configuration when they are not in use and include sufficient lost motion, so that the ends of the rods may directly abut one another when the several rods are aligned with one another. Slip sleeves are provided at each joint between the several rods so that the sleeves may be slid away from the joint onto an upper rod when the assembly is not in use, and may be slid down to overlap both rods on either side of the joint, when the fishing rod support assembly is to be used. One end of one rod at the lower end of the assembly is pointed for ease of pounding the assembly into the ground, and a recess is provided in the upper end of the uppermost rod, to receive a V-shaped spring which may be alternatively pressed down into the recess, or pulled outwardly to form a V-shaped support for the fishing rod. A transverse pin extending across the recess near the outer end of the upper rod serves to retain the V-shaped spring within the assembly. The outer tips of the V-shaped spring are bent outward sharply, and the upper end of the upper rod is relieved, so that when the V-shaped spring is pressed down into the recess, it is below the end surface of the upper rod.

With the arrangement as described hereinabove, the assembly may be initially carried in a person's pocket or in a fishing tackle box and has an overall length of only about 6 inches. Then when it is desired to use the rod holding assembly, it is unfolded, the slip sleeves are slid down over the joints, and the resulting assembly is pounded into the ground using a rock or the like. The V-shaped spring is then pulled out of its recess and the fishing rod may immediately be leaned forward into the support provided by the V-shaped spring.

The slip sleeves may be provided with stops on the rod below each joint, so that gravity will bias the slip sleeves down into engagement with the stops at the proper location where the slip sleeves overlap each of the two rod ends by an approximate equal amount. Concerning another matter, the V-shaped spring may be either made of flat or rounded spring stock, with the rounded configuration being preferred for greater strength and a reduced required hole diameter.

The assembly may be provided with arrangements for supporting it without pounding it into the ground. These arrangements may be either a flat base having a central recess for receiving the pointed end of the assembly, or may take the form of a tripod with a circular ring for encompassing the lower end of the assembly, and a set screw for engaging the lowermost rod near its pointed end.

Concerning another alternative, the upper end of the assembly may be provided with a pivoted rod-holding member near the top of the assembly for use in place of the V-shaped spring. This member may be pivoted up for compactness during storage, and may be pivoted outwardly to permit pounding on the end of the rod, and for ease in holding the shaft of the fishing rod.

Other objects, features, and advantages of the invention will become apparent from a consideration of the following detailed description and from the accompanying drawings.

BRIEF DESCRIPTION OF THE DRAWINGS

FIG. 1 is a side view, partially in cross section, showing an assembly illustrating the principles of the present invention;

FIG. 2 is a side view, partially in cross section, showing the assembly in the folded-up configuration;

FIG. 3 shows one of the links which may be employed at the pivot points between adjacent rods;

FIG. 4 is an enlarged view of the upper end of the assembly, with the V-shaped fishing rod engaging spring in the stored position;

FIG. 5 is a partial cross-sectional view of the upper end of the assembly with the V-shaped spring in its extended position;

FIG. 6 is an upper end view of the upper rod, showing the relieved areas where the V-shaped spring ends fit when it is in its retracted position;

FIG. 7 shows a V-shaped spring per se;

FIG. 8 shows a tripod arrangement for mounting the assembly;

FIG. 9 shows two components of the tripod assembly of FIG. 8; and

FIG. 10 shows an alternative rod support for the upper end of the fishing rod supporting assembly.

DETAILED DESCRIPTION

Referring more particularly to the drawings, FIG. 1 is a side view, partially in cross section, showing a foldable fishing rod supporting assembly in the upright configuration, ready for use. The fishing rod support assembly of FIG. 1 includes three cylindrical aluminum rod sections 12, 14 and 16. The lower end 18 of the lower section 12 is pointed so that it may readily be driven into the ground. The upper end of the upper rod section 16 is provided with a recess 20 and a transverse pin 22 for holding the V-shaped sheet metal spring 24 in place. A recess 20 may be a drilled hole, and the springy member 24 may be compressed together and shoved down into the opening 20.

The joints between the three rods 12, 14 and 16 are held in their aligned configuration as shown in FIG. 1 by the two slip sleeves 26 and 28. A stop 30 is formed on the surface of the shaft 12 in the indicated location, so that the force of gravity will hold the slip sleeve 26 in the indicated position, in engagement with stop 30, and overlapping the two shafts 12 and 14 by substantially the same amount. Similarly, the stop 32 serves the same function relative to the slip sleeve 28. An upper stop 33 prevents the slip sleeve 28 from sliding off the upper end of the rod 16. Similarly, stop 32 prevents undue upward movement of the sleeve 26.

The joints between the rod sections 12, 14 and 16 are accomplished by links such as the link 34 shown at the junction between rods 14 and 16 and in the showing of FIG. 3 of the drawings. Each of the rods 14 and 16 includes transverse slots 36 and 38, respectively, and transverse pins 40 and 42, respectively, around which the link 34 extends. The lower joint between rod sections 12 and 14 is shown oriented at 90 degrees around the axis of the assembly, relative to the upper joint, for completeness of showings; however, the lower joint would normally be aligned with the upper one. In connection with the lower joint, the ends of the two pins 44 and 46, which extend through one of the links, are shown.

In the event that the assembly is to be used in an area where it is not possible to drive the assembly into the ground, a base member 52 may be provided, with a central recess 54 and enclosing sleeve 56 to hold the lower end of rod 12 upright on the base 52.

FIG. 2 is a side view of the present invention showing the three rods 12, 14 and 16 folded up in a side-by-side manner. In FIG. 2, the ends of the rods where they join one another are shown broken away to indicate the upper link 34, and the lower link 58. The four transverse pins 40, 42 associated with link 34, and 44, 46 associated with link 58 are also shown.

FIGS. 4 and 5 are side views in partial cross section of the upper end of the upper rod 16, showing the spring 24 in its lower or recessed position (FIG. 4), and in its upper or operative position (FIG. 5). FIG. 6 is an end view of the rod 16 from the upper end before the spring 24 and the pin 22 have been put in place. The drill hole 20 is clearly shown in FIG. 6, as are the relieved areas 62 and 64 into which the sharply out-turned ends 66 and 68 of the V-shaped spring steel member 24 fit when the spring is in its recessed position.

Incidentally, when the slip sleeves shown in FIG. 1 are overlapping the adjacent joints of the three rod sections, the ends of the rods are free to abut one another, in view of the opening in the central area of the links 34 and 58, which permit the rods to move together toward one another. In addition, with the spring 24 recessed as indicated in FIG. 4 of the drawings, the upper surfaces of the upper rod 16 are clear. Accordingly, with the assembly in this configuration, it may be pounded into the ground, without damaging either the V-shaped spring 24 or the pivot pins or links. After the assembly is driven into the ground using a rock or other convenient or solid object, the outer tips 66 and 68 of the V-shaped spring are engaged, and the spring is pulled up to the position shown in FIGS. 1 and 5 of the drawings, and it is ready for use, to receive the shaft of a fishing pole wherein the end of the handle and the reel are on one side of the assembly, and the fishing pole extends upwardly into fishing position, in the other direction from the assembly of FIG. 1.

FIG. 8 shows a tripod including ring member 72 and three legs 74 which may be employed instead of the base 52, 54, 56, as shown in FIG. 1. FIG. 9 shows the ring 72 together with a locking screw 76 which may be employed to hold the tripod onto the lower end of the rod section 12. Again, it is noted that the arrangements shown in FIGS. 8 and 9 are appropriate when it is not convenient or practical to pound the assembly directly into the ground.

FIG. 10 shows an alternative arrangement for holding the shaft of a fishing pole. More specifically, the upper end of one rod 16' of an assembly such as that shown in FIG. 1, is provided with a pivoted member 82, which is pivoted in a slot in the upper end of the shaft 16', and is held in place by a pin 84. The configuration as shown in FIG. 10 is employed when the fishing pole shaft is to be supported; alternatively when the fishing pole is to be stored or folded up, as indicated in FIG. 2, for example, the member 82 would be folded inwardly toward the upper end of shaft 16', so that it would not protrude unduly from the complete folded assembly.

For completeness, the dimensions of one preferred operative embodiment of the invention will now be given. Specifically, each of the three rods 12, 14 and 16, are formed of aluminum rods having a circular cross section approximately $\frac{3}{8}$ inch in diameter, and they are each about 6 inches long. The overall height of the unit is more than 18 inches. The V-shaped spring is made of flat spring steel strip material approximately $\frac{1}{8}$ inch wide, and the V-shaped spring extends approximately $\frac{5}{8}$ inch beyond the upper end of the rod 16 when the spring is in its extended position. The links 34 and 58 are approximately $\frac{3}{4}$ inch in length, and the slip sleeves are approximately 1-11/16ths inch in length and have an outer diameter of approximately $\frac{1}{2}$ inch. It is to be understood that the foregoing are typical dimensions which may be used for normal applications and that somewhat larger dimensions or smaller dimensions could, of course, be employed in the case of heavier or lighter duty applications.

Incidentally, certain prior art fishing rod holder arrangements are shown in U.S. Pat. No. Des. 190,330, and in U.S. Pat. Nos. 2,665,860; 3,411,231; and 3,906,653. However, these proposed arrangements are all relatively cumbersome, complex and expensive, as compared with the simple, low cost and easily stored arrangements as disclosed in the present specification.

In conclusion, it is to be understood that the foregoing detailed description and the accompanying drawings relate to an illustrative preferred embodiment of the invention. Other arrangements may be employed to implement specific features of the invention without departing from the spirit and scope of the entire invention. Thus, by way of example, and not of limitation, the rods 12, 14 and 16 could be rectangular in configuration instead of being round. Also, other lost motion pivoting arrangements may be provided in place of those shown using the links 34 and 58, and other locking arrangements may be employed to hold the rod sections 12, 14 and 16 in alignment, as indicated in FIG. 1, instead of the slip sleeves 26 and 28. As another alternative, the lower two of the three rods may have the sleeves secured to their upper ends, and for storage the three rods may be completely separated and slid into a closely fitting heavy plastic receptacle having a smap closure. Further, instead of stops 34, which are formed by impacting the aluminum rods with a punch, or the like, separate small screws could be employed. In addition, more or less than three sections could be utilized, in the event that a longer, shorter support rod or different configuration is desired. Accordingly, the present invention is not limited to the configuration precisely as shown in the drawings, and as set forth in the detailed description.

What is claimed is:

1. A compact fishing rod support assembly comprising:
   at least three rods of substantially equal length;
   means for pivotally connecting said rods together to permit them to be folded side by side;
   slip sleeve means mounted on said rods for selectively holding said rods aligned with one another to form a rigid support, with the ends of said rods abutting and in engagement with one another;
   the outer end of one rod at one end of said assembly being pointed to easily penetrate the earth for mounting said assembly upright;
   the outer end of a recessed rod at the other end of said assembly having an inner recess;
   spring means mounted in the recessed outer end of said recessed rod and having a substantial V-shape for receiving and holding a fishing pole on the upper end of the assembly;
   pin means extending across said recess for retaining said spring means at the end of said recessed rod; and
   said recess being of sufficient depth and having a configuration to permit said spring means to slide down into said recess below the outer end surface of said rod;
   whereby said assembly may be unfolded, said slip sleeve means slid over the joints thereof, with the spring in said recess, and the assembly may be pounded into the ground using a rock or the like without damaging the pivot points or the spring, and the V-shaped spring may be subsequently extended to hold a fishing pole.

2. A compact fishing rod support assembly as defined in claim 1 further comprising stop means located below each of said slip sleeve means for holding said slip sleeve means in overlapping relationship with each of two adjacent rods to hold said rods in alignment with one another.

3. A compact fishing rod support assembly as defined in claim 1 wherein said means for pivotally connecting said rods together includes slots in the adjacent ends of each of said rods, pins extending across said slots, said pins being oriented transverse to longitudinally axis of said rods, and individual link means extending around pairs of said pins for permitting limited longitudinal movement of said rods relative to the adjacent rod.

4. A compact fishing rod support assembly as defined in claim 1 wherein the upper end of said recessed rod has relieved areas, and where the outer ends of said spring are sharply bent outwardly away from the longitudinal axis of said recessed rod to fit into the relieved areas at the end of said rod whereby said assembly may be pounded into the ground by an impact member such as a hammer or a rock without damaging the spring.

5. A compact fishing rod support assembly as defined in claim 1 further comprising support means for engaging the lower end of said assembly for holding said rods erect without pounding said assembly into the ground.

6. A compact fishing rod support assembly as defined in claim 5 wherein said support means is a base plate including a recess for engaging the lower end of said assembly.

7. A compact fishing rod support assembly as defined in claim 5 wherein said support means is a tripod.

8. A compact fishing rod support assembly comprising:
   at least three rods of comparable length;
   means for pivotally connecting said rods together to permit them to be folded side by side;
   slip sleeve means mounted on said rods for selectively holding said rods aligned with one another to form a rigid support, with the ends of said rods abutting and in engagement with one another;
   the outer end of one rod at one end of said assembly being pointed, to easily penetrate the earth for mounting said assembly upright; and
   fishing rod holding means mounted at the other end of said assembly from the pointed end thereof, for selectively holding a fishing rod, said holding means being shiftable between a storage poisition for use when said assembly is folded up and an operative position for holding the shaft of a fishing pole, said holding means being free of interference with the upper end of said assembly in one of said two positions;
   whereby said assembly may be unfolded, said slip sleeve means slipped over the joints thereof, and said assembly pounded into the ground with said holding means clear of the upper end of said assembly, and the assembly may then hold the shaft of a fishing pole.

9. A compact fishing rod support assembly as defined in claim 8 further comprising stop means located below each of said slip sleeve means for holding said slip sleeve means in overlapping relationship with each of two adjacent rods to hold said rods in alignment with one another.

10. A compact fishing rod support assembly as defined in claim 8 wherein the pivoted connecting means includes means for permitting the ends of said rods to abut one another when the rods are aligned with one-another.

11. A compact fishing rod support assembly as defined in claim 8 wherein said holding means is a V-shaped spring.

12. A compact fishing rod support assembly as defined in claim 8 wherein said holding means is hook pivotally mounted close to the upper end of said assembly.

13. A compact fishing rod support assembly comprising:
   at least three rods having a combined length of about fourteen inches to thirty inches;
   sleeve means mounted on said rods for selectively holding said rods aligned with one another to form a rigid support, with the ends of said rods abutting and in engagement with one another;
   said sleeve means permitting collapsing of said assembly to permit said rods to be located side-by-side for storage;
   the outer end of one rod at one end of said assembly being pointed to easily penetrate the earth for mounting said assembly upright; and
   fishing rod holding means mounted at the other end of said assembly from the pointed end thereof, for selectively holding a fishing rod, said holding means being shiftable between a storage position for use when said assembly is folded up and an operative position for holding the shaft of a fishing pole, said holding means being free of interference with the upper end of said assembly in one of said two positions;

whereby said assemboly may be assembled, using sleeve means to slip over the joints thereof, and said assembly pounded into the ground with said holding means clear of the upper end of said assembly, and the assembly may then hold the shaft of a fishing pole.

14. A compact fishing rod support assembly as defined in claim 13 wherein said holding means is a V-shaped spring.

15. A compact fishing rod support assembly as defined in claim 8 wherein said holding means is hook pivotally mounted close to the upper end of said assembly.

16. A compact fishing rod support assembly as defined in claim 13 further comprising support means for engaging the lower end of said assembly for holding said rods erect without pounding said assembly into the ground.

17. A compact fishing rod support assembly as defined in claim 16 wherein said support means is a base plate including a recess for engaging the lower end of said assembly.

18. A compact fishing rod support assembly as defined in claim 16 wherein said support means is a tripod.

* * * * *